United States Patent
Long et al.

(10) Patent No.: US 8,554,996 B2
(45) Date of Patent: Oct. 8, 2013

(54) DYNAMICALLY EXPANDING STORAGE CAPACITY OF A STORAGE VOLUME

(75) Inventors: James Louis Long, Fort Collins, CO (US); Matthew D. Haines, Fort Collins, CO (US); Charles Martin McJilton, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 283 days.

(21) Appl. No.: 13/002,606

(22) PCT Filed: Jul. 7, 2008

(86) PCT No.: PCT/US2008/069286
§ 371 (c)(1), (2), (4) Date: Jan. 4, 2011

(87) PCT Pub. No.: WO2010/005421
PCT Pub. Date: Jan. 14, 2010

(65) Prior Publication Data
US 2011/0107028 A1    May 5, 2011

(51) Int. Cl.
*G06F 12/02* (2006.01)

(52) U.S. Cl.
USPC .............. 711/114; 711/172; 711/173

(58) Field of Classification Search
None
See application file for complete search history.

(56) References Cited

U.S. PATENT DOCUMENTS

| | | | |
|---|---|---|---|
| 2005/0027938 A1* | 2/2005 | Burkey | 711/114 |
| 2007/0283089 A1* | 12/2007 | Tsurudome | 711/114 |
| 2008/0091916 A1* | 4/2008 | Hashemi | 711/209 |
| 2009/0089504 A1* | 4/2009 | Soran et al. | 711/114 |
| 2009/0195657 A1* | 8/2009 | Peng et al. | 348/177 |
| 2009/0240882 A1* | 9/2009 | Shiga et al. | 711/114 |
| 2009/0240910 A1* | 9/2009 | Inomata et al. | 711/171 |
| 2009/0287880 A1* | 11/2009 | Wright et al. | 711/114 |

* cited by examiner

*Primary Examiner* — Than Nguyen

(57) ABSTRACT

A storage system includes at least one storage device on which are provided data storage volumes and an extended storage volume. The data storage volumes include a first data storage volume that is implemented with a data protection mechanism, and a second data storage volume that is implemented without the data protection mechanism. Also, an extended storage volume is provided that is initially un-allocated to any of the data storage volumes. A controller dynamically allocates at least one portion of the extended storage volume to the particular data storage volume to dynamically expand storage capacity of the particular data storage volume.

17 Claims, 5 Drawing Sheets

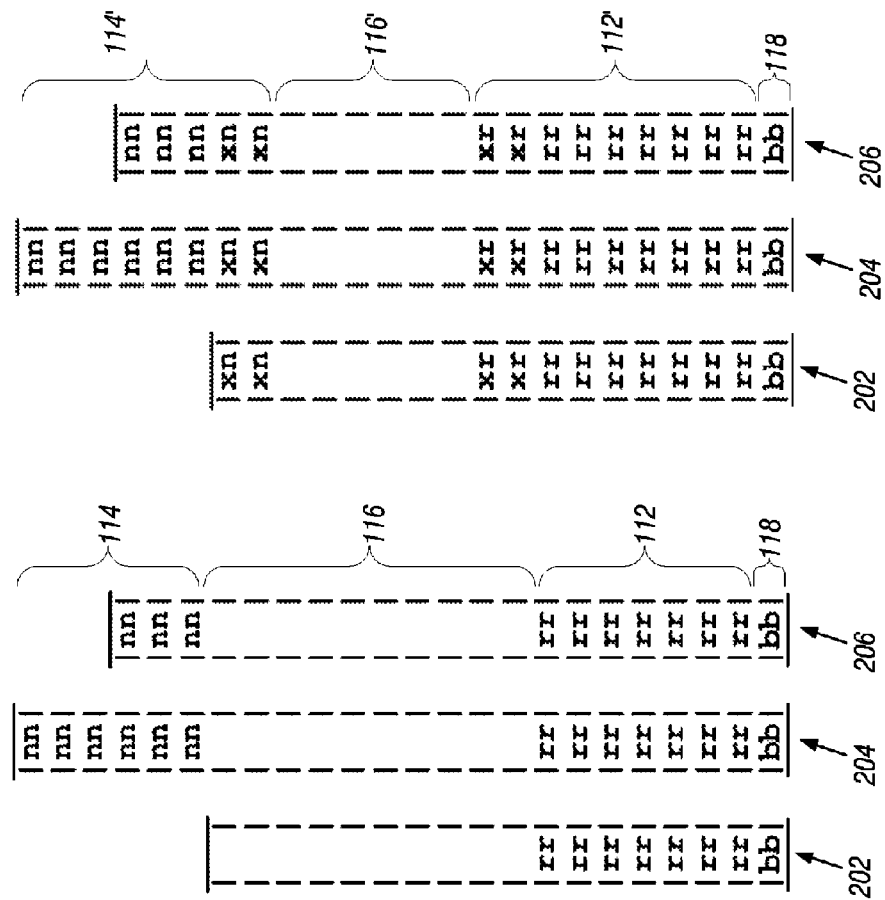

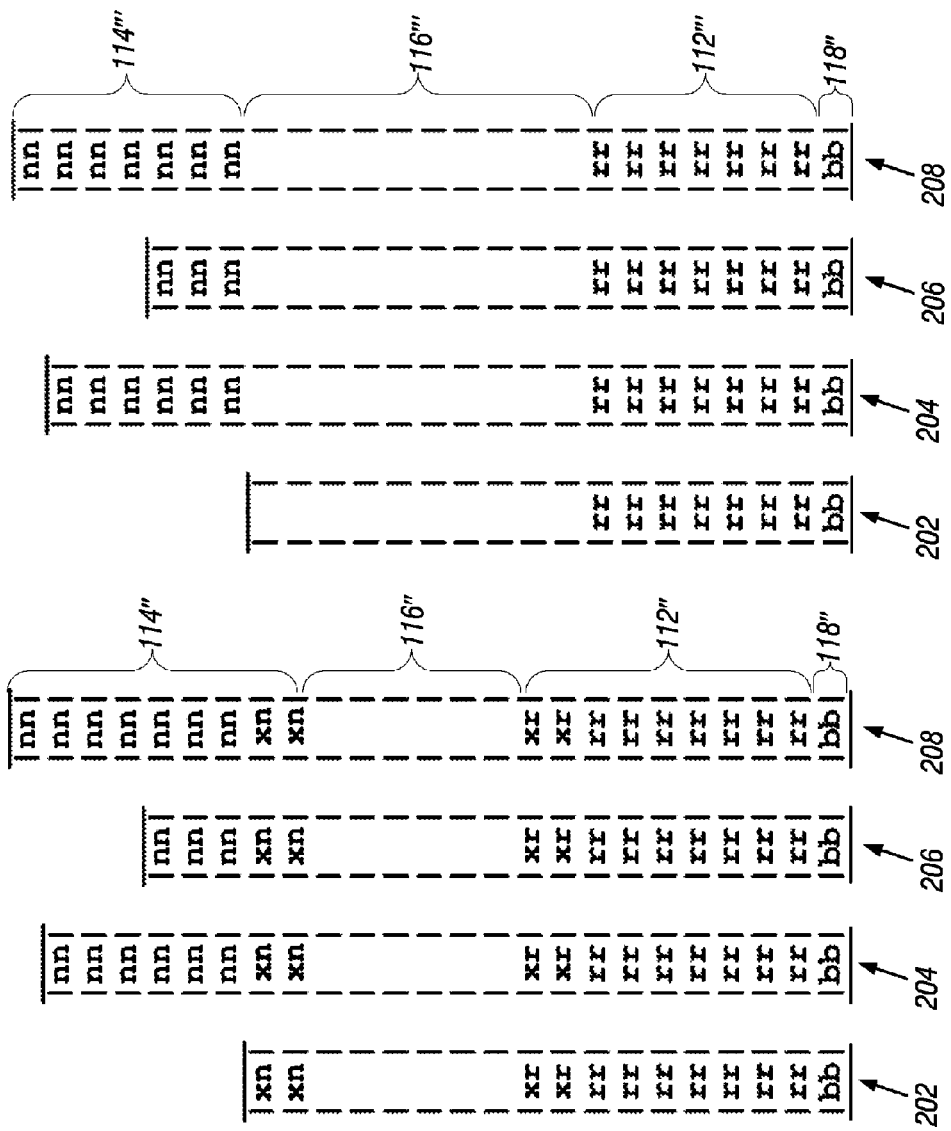

DYNAMICALLY EXPANDING STORAGE CAPACITY OF A STORAGE VOLUME

BACKGROUND

In setting up a storage system that uses a data protection mechanism such as RAID (Redundant Arrays of Inexpensive Disks), it is often difficult to determine accurately how much disk space to pre-allocate to a part of the storage system that uses RAID (referred to as "RAID storage"), and how much disk space to leave for another part of the storage system that does not employ RAID.

Normally, a system administrator has to guess ahead of time how much space to allocate the RAID storage. If inadequate space is pre-allocated to the RAID storage, then the RAID storage would run out of space at a later point in time during operation of the storage system. As a result, a system administrator may have to manually expand the capacity of the RAID storage. Expanding capacities of a RAID storage may involve offloading all data of the RAID storage onto an external storage system, re-partitioning the physical storage infrastructure, and then loading the data back into the new RAID storage. Such an approach can be time consuming and labor intensive.

BRIEF DESCRIPTION OF THE DRAWINGS

Some embodiments of the invention are described, by way of example, with respect to the following figures:

FIGS. 2-5 illustrate examples of expanding storage capacity of storage volumes, according to some embodiments.

DETAILED DESCRIPTION

Figure 1A:
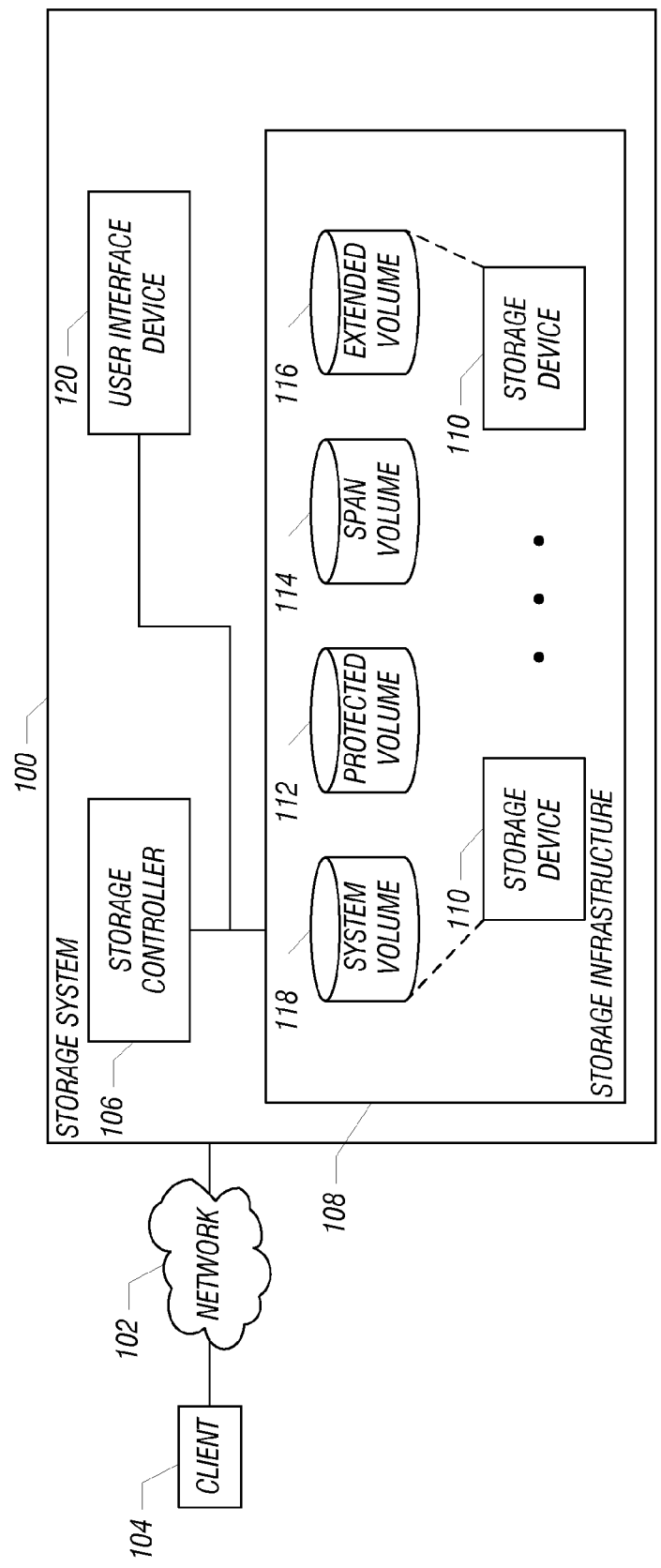
FIG. 1A is a block diagram of a network arrangement that includes a storage system, according to an embodiment.

In accordance with some embodiments, a technique to dynamically expand storage capacities of storage volumes in a storage system is provided. A "storage volume" refers to some logical partition of a physical storage infrastructure, which is formed of physical storage devices in a storage system. In accordance with some embodiments, various types of storage volumes can be defined. A first type of storage volume is a data storage volume, which is used for storing data (which can include user data, application data, software instructions, system data, etc.). A second type of storage volume is an "extended storage volume," which is a logical partition of the physical storage infrastructure that is initially not allocated to store any data. An extended storage volume includes portions that can be dynamically allocated to one or more of the data storage volumes on an as-needed basis, according to actual usage of the data storage volumes. For example, if a particular one of the data storage volumes is being used such that additional space is desired, then a controller in the storage system according to some embodiments is able to allocate one or more portions from one or more extended volumes to the particular data storage volume to dynamically expand the storage capacity of the particular data storage volume.

In some example implementations, there can also be other types of storage volumes (e.g., boot storage volume to store system boot information, swap storage volume to provide swap space for an operating system, and so forth).

The data storage volumes of the storage system can include at least a first data storage volume that is protected by a data protection mechanism, and a second data storage volume that is not protected by the data protection mechanism. A "data protection mechanism" refers to a mechanism or algorithm that allows recovery of data in the presence of data errors. One exemplary data protection mechanism is a mirror data protection mechanism, in which data of a particular storage device (or storage devices) is mirrored (or copied) to a redundant storage device (or storage devices). One form of such mirror data protection mechanism is RAID 1, where RAID refers to Redundant Arrays of Inexpensive Disks. A RAID 1 configuration provides a mirrored set without parity, in which two groups of physical storage devices are provided where one of the groups of physical storage devices is used to mirror (replicate) data on the other group of physical storage devices.

There are also other RAID levels, such as RAID 5 or RAID 6 (which are examples of other types of data protection mechanisms). A RAID 5 configuration provides a striped set with distributed parity, which includes at least three groups (up to five groups) of physical storage devices. RAID 5 is tolerant to failure of one of the groups of physical storage devices. A RAID 6 configuration provides a striped set with dual parity to provide fault tolerance in the presence of two of the groups of physical storage devices.

In accordance with some embodiments, portions of the extended storage volume(s) can be dynamically allocated to protected data storage volumes (data storage volumes that use a data protection mechanism) and/or non-protected data storage volumes (data storage volumes that do not use the data protection mechanism). By being able to add portions of the at least one extended storage volume to data storage volumes to dynamically expand the capacity of such data storage volumes, a system administrator does not have to accurately determine, ahead of time, how much space to pre-allocate each of the data storage volumes, since additional space can be dynamically allocated to any of the data storage volumes on an as-needed basis. As a result, a lot of the guesswork can be eliminated when configuring data storage volumes in a physical storage infrastructure. Also, by being able to dynamically allocate portions of extended storage volume(s) to data storage volume(s), labor- and time-intensive re-partitioning of data storage volumes to expand their capacities can be avoided.

A benefit offered by some embodiments of the invention is that a technique is provided to delay the allocation of portions of the extended storage volumes to data storage volumes that employ a data protection mechanism such as RAID for as long as possible, until the system detects that more space has to be allocated to the data storage volumes that employ the data protection mechanism.

Figure 1B:
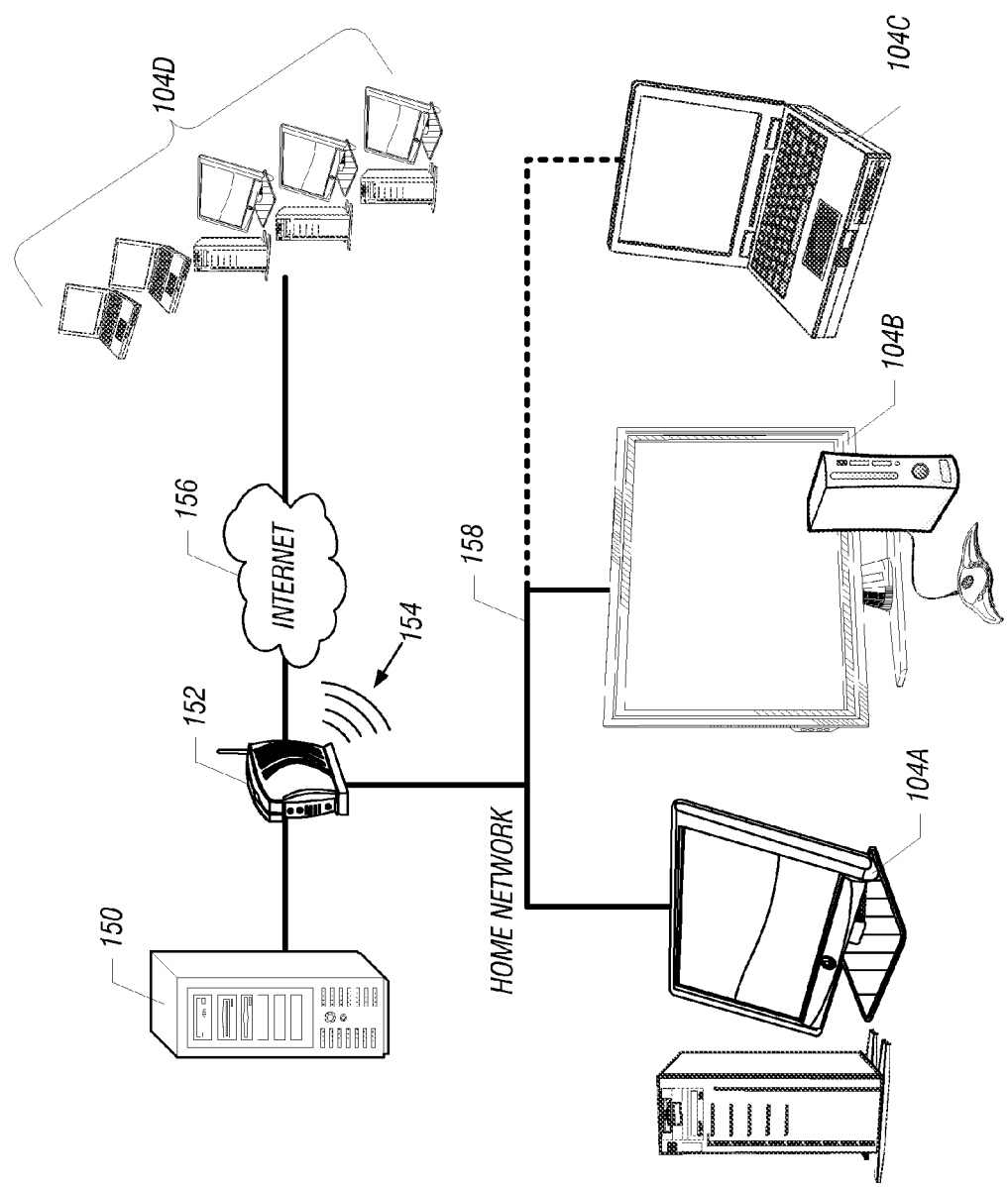
FIG. 1B is a block diagram of another exemplary arrangement in which an embodiment of the invention can be incorporated.

FIG. 1A shows an exemplary implementation of a storage system 100, which can be a network-attached storage (NAS) system or some other type of storage system (e.g., a storage system connected to a storage area network, a storage system that is part of a file server, and so forth). The storage system 100 is coupled over a data network 102 to one or more client devices 104. A client device 104 is able to issue requests to access (read or write) data in the storage system 100. The client devices 104 can be computers (desktop or notebook computers), personal digital assistants (PDAs), network appliances, and so forth. Although depicted as a single network, it is noted that network 102 can actually include multiple networks in some implementations. In fact, the network 102 can represent a collection of networks, with client devices connected to such collection of networks possibly located geographically far apart from each other. For example, FIG. 1B shows client devices 104A and 104B connected over a wired home network 158 and through a router 152 to a server 150, which can contain the storage system 100 of FIG. 1A. A client device 104C is connected by a wireless link 154 to the router 152. Also, client devices 104D are connected over the Internet 156 and through the router 152 to the server 150.

The storage system 100 of FIG. 1A includes a storage controller 106, which can be implemented with a processor, microcontroller, and so forth. The storage controller 106 is coupled to a storage infrastructure 108, which includes a number of physical storage devices 110 (e.g., magnetic or optical disk drives, semiconductor storage devices, and so forth). The physical storage devices 110 form a pool of storage devices.

Logical data storage volumes 112, 114 can be defined on the physical storage devices 110 (in other words, the physical storage devices can be partitioned to form multiple logical storage volumes, where two of those logical storage volumes include data storage volumes 112 and 114). In the example of FIG. 1, the data storage volume 112 is a protected data storage volume (which uses a data protection mechanism), while the data storage volume 114 is a span (or non-protected) storage volume (which does not use the data protection mechanism). In other implementations, additional data storage volumes can be provided in the storage infrastructure 108, where the additional data storage volumes can include protected and/or span storage volumes.

In addition to the protected data storage volume 112 and span data storage volume 114, an extended storage volume 116 is also provided, where the extended storage volume can be defined on one or more of the physical storage devices 110. The extended storage volume 116 includes multiple portions that can be dynamically allocated to one or both of the protected data storage volume 112 and span data storage volume 114 on an as-needed basis.

The storage infrastructure 108 can also include one or more system storage volumes 118 to store system data (e.g., boot data, swap data, etc.).

Each of the data storage volumes 112 and 114 can be configured with a minimum free space parameter and a maximum free space parameter. The minimum free space parameter specifies the amount of free space below which expansion of the data storage volume is triggered. In other words, if the amount of free space of a data storage volume falls below the value specified by the minimum free space parameter, then expansion of the storage capacity of the data storage volume will be performed (by allocating portions of the extended storage volume). The maximum free space parameter specifies the amount of free space above which the data storage volume is flagged as being available for size reduction. In other words, if the amount of free space of a data storage volume rises above the value specified by the maximum free space parameter, then an indication (e.g., flag) is provided to allow the storage capacity of the data storage volume to be reduced by returning one or more portions from the data storage volume back to the extended storage volume. Free space can be specified as a percentage of the total volume size, or as an absolute volume (e.g., x gigabytes or GB).

A data storage volume can be expanded or reduced either automatically (using the storage controller 106) or manually by a system administrator, such as through a user interface device 120 (e.g., display device that presents a graphical user interface in which a user can make selections with a pointer device or keyboard, for example).

The extended storage volume 116 can be configured with multiple portions. In some embodiments, the multiple portions can be of varying sizes. For example, assuming that a unit storage space is represented as S (where S can represent any predefined size in terms of bytes or kilobytes), the extended volume 116 can be divided by S. Then, the portions of the extended storage volume can include portions each of size 1S, portions each of size 2S, portions each of size 4S, portions each of size 8S, and so forth.

In one implementation, the first time a data storage volume is to be allocated additional storage space, a portion of size 1S can be allocated from the extended volume 116 to the data storage volume. However, the second time that the data storage volume is to be allocated additional space, then the controller can allocate a portion having size 2S to the data storage volume, while de-allocating (or not) the previously allocated 1S portion. This is repeated in each subsequent allocation of additional storage capacity to the data storage volume, with each such subsequent allocation being an allocation of an incrementally larger portion (of size 4S, 8S, and so forth). Such progressive allocation of incrementally larger portions with successive allocations of additional storage space to a given data storage volume provides greater control in the allocation granularity. In some implementations, multiple portions of different sizes can be combined to provide arbitrarily sized portions to add to a particular data storage volume.

FIG. 2 shows an example of a storage system that includes three physical storage devices 202, 204, and 206. Initially, the span data storage volume 114 includes portions (labeled "nn") of physical storage devices 204 and 206 (but not 202). However, the protected data storage volume 112 includes portions (labeled "rr") distributed across all three physical storage devices 202, 204, 206. Since three physical storage devices are provided, the data storage volume 112 can be a RAID 5 storage volume (protected with a RAID 5 mechanism). The non-allocated space in the physical storage devices 202, 204, 206 between the span data storage volume 114 and protected data storage volume 112 forms the extended volume 116, which is initially not allocated to either of the span or protected data storage volumes 114 and 112. FIG. 2 also shows a system storage volume 118, which can store boot data, for example, that includes portions of the three physical storage devices 202, 204, 206.

Note that some initial storage capacity is allocated to the protected data storage volume 112 and some initial storage capacity is allocated to the span data storage volume 114. The exact sizing is configured at system installation time, and can be based on the size of the physical storage devices and a system administrator's preference. In the example of FIG. 2, the physical storage devices 202, 204, and 206 are of different sizes (depicted with different lengths in FIG. 2). The span data storage volume 114 is defined to include the end portions of the physical storage devices 202, 204, and 206, whereas the protected data storage volume 116 is defined to include the beginning or intermediate portions of the physical storage devices. Since no data protection mechanism is employed for the span storage volume 114, the end portions of the physical storage devices 202, 204, and 206 can be allocated to the span storage volume 114 (since it does not matter that different numbers of portions from different physical storage devices 202, 204, and 206 are allocated to the span storage volume 114). On the other hand, to enable a data protection mechanism (e.g., mirroring, RAID 5, RAID 6, etc.), the number of portions of each of the physical storage devices allocated to the protected data storage volume 112 may have to be the same so that it may not be feasible to use the end portions of the physical storage devices for the protected storage volume 112.

During operation, as data is written to the data storage volumes 114 and 118 to fill up the volumes 114 and 118, expansion of the data storage volumes 114 and 118 may be triggered to dynamically add portions of the extended volume 116 to the volumes 114 and 118. As shown in FIG. 3, the expanded portions are indicated by "xn" in expanded span volume 114', and indicated by "xr" in expanded protected volume 112'. The reduced extended storage volume is referenced as 116'. Note that the expanded span volume 114' in FIG. 3 includes portions of the physical storage device 202, whereas the initial span volume 114 of FIG. 2 does not include any portion of the physical storage device 202.

FIG. 4 illustrates an example where a new physical storage device 208 has been added. The new physical storage device 208 is partitioned in similar fashion as the other physical storage devices 202, 204, and 206, with upper portions (in FIG. 4) of the new physical storage device 208 allocated to the span data storage volume 114", and lower portions (in FIG. 4) allocated to the protected data storage volume 112". Adding portions of the new physical storage device 208 to the span and protected volumes causes the storage space of the span and protected volumes 114" and 112" to be increased (as compared to the span and protected volumes 114' and 112' of FIG. 3). Note that since a new physical storage device 208 has been added, each of the span and protected storage volumes 114" and 112" can have free space that exceeds a respective maximum free space parameter, in which case the span volume 114" and protected volume 112" can be flagged for storage capacity reduction. To perform storage capacity reduction, some of the new portions added to the expanded span data storage volume 114" and 118", labeled as "xn" and "xr," respectively, can be moved to the extended storage volume 116". After moving the portions from the volumes 114" and 112" to extended volume 116", the configurations of the various volumes are depicted in FIG. 5, which shows span volume 114''', protected volume 112''', and extended volume 116'''.

Note that physical storage devices can be added and removed without taking the storage system offline. Also, migrating between different RAID levels can also be performed. For example, a RAID 5 configuration of the protected data storage volume 112" of FIG. 4 can be migrated to a RAID 6 configuration of the data storage volume 112''' of FIG. 5.

Figure 6:
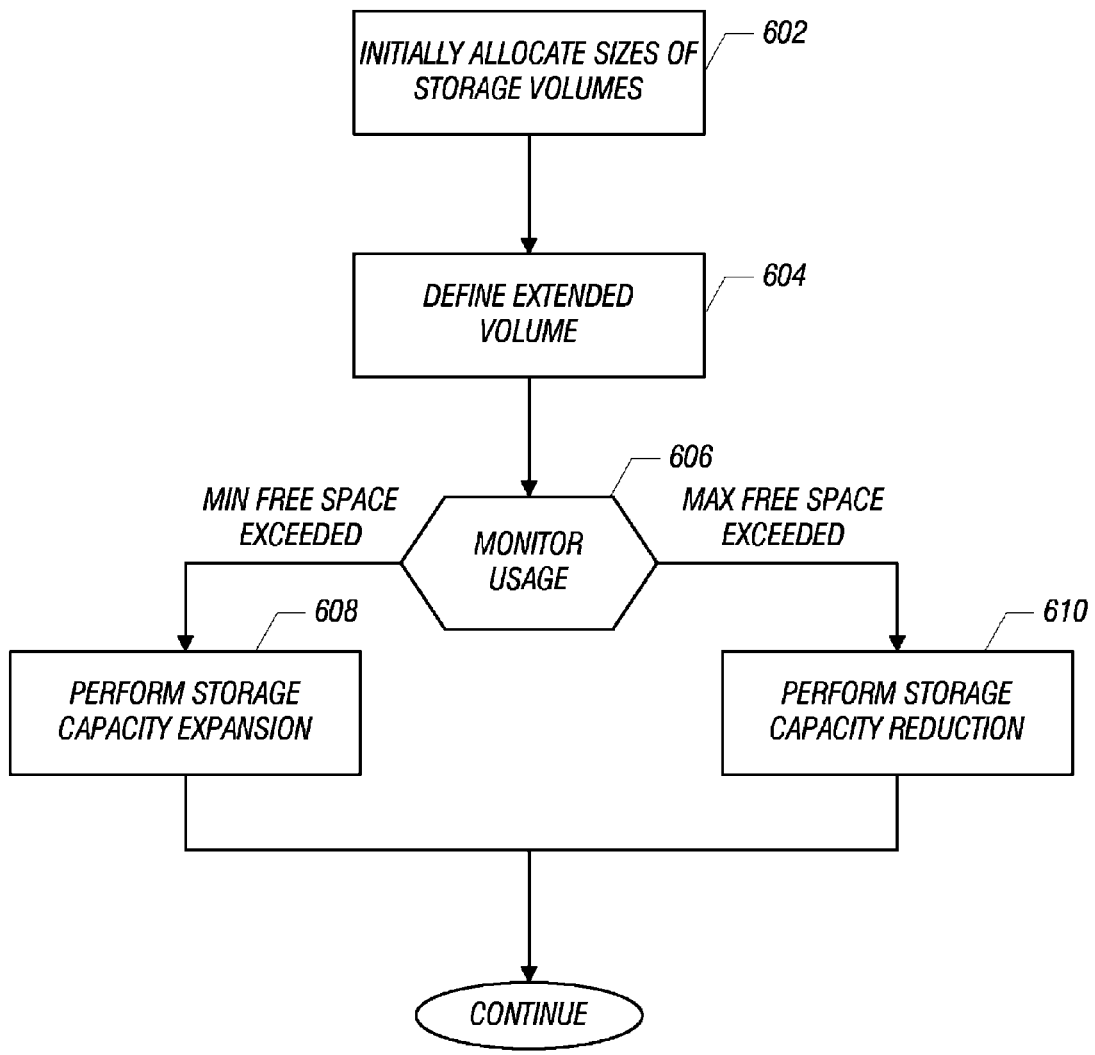
FIG. 6 is a flow diagram of a process of expanding capacity of a storage volume, according to an embodiment.

FIG. 6 shows a process performed by the storage controller 106 (FIG. 1A) according to an embodiment. The storage controller 106 initially allocates (at 602) various data storage volumes having initial sizes, which can be based on settings by the system administrator or other settings. Next, the storage controller 106 defines (at 604) at least one extended volume, which includes space not allocated to any of the data storage volumes.

The storage controller 106 then monitors (at 606) usage of the storage volumes. If the amount of free space available in a particular data storage volume drops below a value of the minimum free space parameter for the particular data storage volume, then storage capacity expansion is performed (at 608). This is accomplished by moving one or more portions of the extended storage volume 116 to the data storage volume that is being expanded.

However, if the monitored usage (at 606) indicates that the amount of free space rises above the value of the maximum free space parameter of the particular data storage volume, then the storage controller 106 performs storage capacity reduction (at 610) for the particular storage volume. In some implementations, this is accomplished by flagging the particular storage volume as a candidate for storage space reduction, with storage space reduction performed later.

In some implementations, the storage controller 106 can be programmed with firmware instructions to perform tasks according to some embodiments. The instructions are loaded for execution by the storage controller 106, which can include microprocessors, microcontrollers, processor modules or subsystems (including one or more microprocessors or microcontrollers), or other control or computing devices. A "controller" can refer to a single component or to plural components.

The instructions can be stored in a storage device in the storage controller 106. The storage device can be implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage system comprising:
   at least one storage device, wherein a plurality of data storage volumes are provided by the at least one storage device to store data, wherein a first of the plurality of data storage volumes is implemented with a data protection mechanism, and a second of the plurality of data storage volumes is implemented without the data protection mechanism, and wherein at least one extended storage volume initially un-allocated to any of the plurality of data storage volumes is also provided by the at least one storage device, wherein the at least one extended storage volume has a plurality of portions of different sizes; and
   a controller to, in response to usage of a particular one of the plurality of data storage volumes, dynamically allocate a portion of the extended storage volume to the particular data storage volume to dynamically expand storage capacity of the particular data storage volume, wherein the dynamically allocated portion of the extended storage volume is a dynamically selected one of the plurality of portions of different sizes, wherein the controller is to progressively select larger size portions of the extended storage volume with an increasing number of times that allocations of additional storage space are made to the particular data storage volume.

2. The storage system of claim 1, wherein the controller is to further allocate another portion of the extended storage volume to another one of the plurality of data storage volumes in response to usage of the another one of the plurality of storage volumes.

3. The storage system of claim 1, wherein the particular storage volume is associated with a first parameter to indicate an amount of minimum free space for the particular data storage volume, the controller to dynamically allocate the portion of the extended volume to the particular data storage volume in response to detecting that an amount of free space available on the particular data storage volume has dropped below the minimum free space.

4. The storage system of claim 3, wherein the particular data storage volume is further associated with a second parameter to indicate an amount of maximum free space, and wherein the controller is to further:
provide an indication that the particular data storage volume is a candidate for storage capacity reduction in response to detecting that an amount of free space available in the particular data storage volume has exceeded the maximum free storage space.

5. The storage system of claim 1, wherein the data protection mechanism comprises one of a RAID (Redundant Arrays of Inexpensive Disks) mechanism and a mirror protection mechanism.

6. The storage system of claim 1, further comprising at least another storage device, wherein the storage devices are logically partitioned to provide the plurality of data storage volumes and the at least one extended storage volume.

7. The storage system of claim 1, wherein the plurality of portions of the extended storage volume are allocatable to different ones of the plurality of data storage volumes on a dynamic basis.

8. The storage system of claim 1, wherein the controller) progressively selects incrementally larger size portions of the extended storage volume to allocate to the particular data storage volume with successive allocations of additional storage space to the particular data storage volume.

9. The storage system of claim 1, wherein the controller is configured to further:
determine that a storage capacity of the particular data storage volume is to be reduced; and
reduce the storage capacity of the particular data storage volume by moving at least one portion from the particular data storage volume back to the extended storage volume.

10. The storage system of claim 1, wherein the controller is configured to further:
detect that a new storage device has been added to the storage system; and
identify portions of the new storage device to allocate to the plurality of data storage volumes, wherein un-allocated portions of the new storage device are defined as part of the at least one extended storage volume.

11. The storage system of claim 1, wherein the controller is to allocate a first portion of a first size from the extended storage volume to the particular data storage volume a first time that the particular data storage volume is to be allocated additional storage space, and the controller is to allocate a second portion of a second, larger size from the extended storage volume to the particular data storage volume a second time that the particular data storage volume is to be allocated additional storage space.

12. A method for use in a storage system having storage devices, comprising:
providing a plurality of data storage volumes on the storage devices, wherein at least one of the data storage volumes employs a data protection mechanism, and another of the data storage volumes is without any data protection mechanism;
providing an extended storage volume on the storage devices, wherein the extended storage volume contains portions initially un-allocated to the data storage volumes, wherein the portions of the extended storage volume are of different sizes;
detecting that a particular one of the data storage volumes is to expand during operation of the storage system; and
dynamically allocating a portion of the extended storage volume to the particular data storage volume in response to determining that the particular data storage volume is to be expanded, wherein the dynamically allocated portion of the extended storage volume is a dynamically selected one of the portions of different sizes, wherein the allocating progressively selects larger size portions of the extended storage volume with an increasing number of times that allocations of additional storage space are made to the particular data storage volume.

13. The method of claim 12, further comprising:
determining that a storage capacity of the particular data storage volume is to be reduced; and
reducing the storage capacity of the particular data storage volume by moving at least one portion from the particular data storage volume back to the extended storage volume.

14. The method of claim 12, wherein the allocating allocates a first portion of a first size from the extended storage volume to the particular data storage volume a first time that the particular data storage volume is to be allocated additional storage space, and allocates a second portion of a second, larger size from the extended storage volume to the particular data storage volume a second time that the particular data storage volume is to be allocated additional storage space.

15. An article comprising at least one computer-readable storage medium containing instructions that when executed cause a controller to:
provide a plurality of data storage volumes on the storage devices, wherein at least one of the data storage volumes employs a RAID (redundant array of inexpensive disks) protection mechanism, and another of the data storage volumes is without any RAID protection mechanism;
provide an extended storage volume on the storage devices, wherein the extended storage volume contains portions initially un-allocated to the data storage volumes, wherein the portions of the extended storage volume are of different sizes;
detect that a particular one of the data storage volumes is to expand during operation of the storage system; and
dynamically allocate a portion of the extended storage volume to the particular data storage volume in response to determining that the particular storage volume is to be expanded, wherein the dynamically allocated portion of the extended storage volume is a dynamically selected one of the portions of different sizes, wherein the allocating progressively selects larger size portions of the extended storage volume with an increasing number of times that allocations of additional storage space are made to the particular data storage volume.

16. The article of claim 15, wherein the instructions when executed cause the controller to further:

determine that a storage capacity of the particular data storage volume is to be reduced; and reduce the storage capacity of the particular data storage volume by moving at least one portion from the particular data storage volume back to the extended storage volume.

17. The article of claim 15, wherein the allocating allocates a first portion of a first size from the extended storage volume to the particular data storage volume a first time that the particular data storage volume is to be allocated additional storage space, and allocates a second portion of a second, larger size from the extended storage volume to the particular data storage volume a second time that the particular data storage volume is to be allocated additional storage space.

* * * * *

UNITED STATES PATENT AND TRADEMARK OFFICE
CERTIFICATE OF CORRECTION

| | | |
|---|---|---|
| PATENT NO. | : 8,554,996 B2 | Page 1 of 1 |
| APPLICATION NO. | : 13/002606 | |
| DATED | : October 8, 2013 | |
| INVENTOR(S) | : James Louis Long et al. | |

It is certified that error appears in the above-identified patent and that said Letters Patent is hereby corrected as shown below:

In the Claims

In column 7, line 38, in Claim 8, delete "controller)" and insert -- controller --, therefor.

Signed and Sealed this
Twenty-second Day of April, 2014

Michelle K. Lee
*Deputy Director of the United States Patent and Trademark Office*